Mar. 20, 1923. 1,448,765
J. F. O'CONNOR
FRICTION SHOCK ABSORBING MECHANISM
Filed June 13, 1921 2 sheets-sheet 1
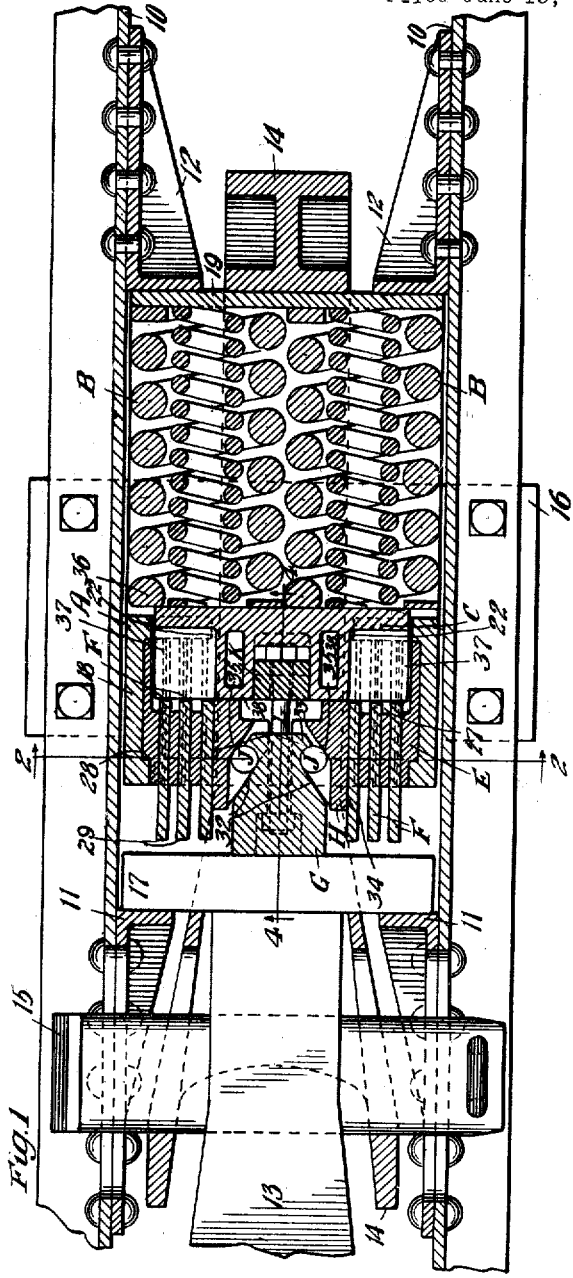
Witnesses
Wm. Geiger
Inventor
John F. O'Connor
By Geo. I. Haight
His Atty.

Mar. 20, 1923.
J. F. O'CONNOR
1,448,765
FRICTION SHOCK ABSORBING MECHANISM
Filed June 13, 1921     2 sheets-sheet 2
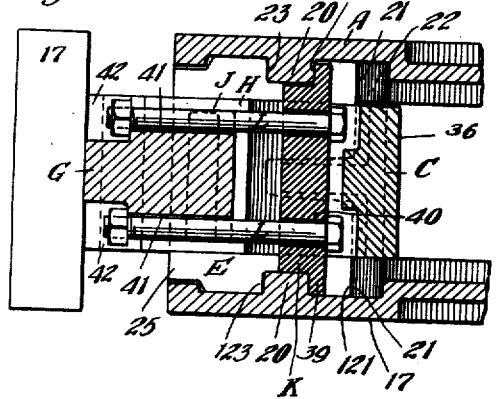
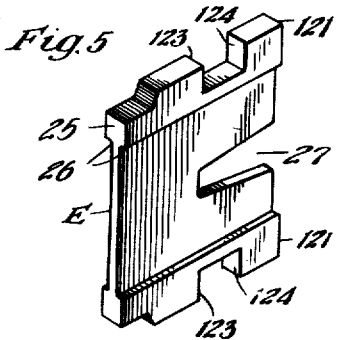
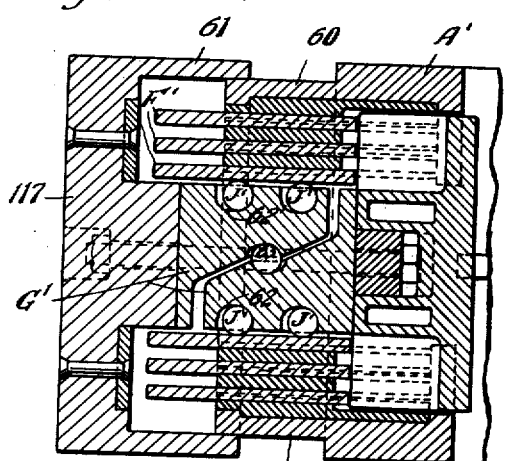
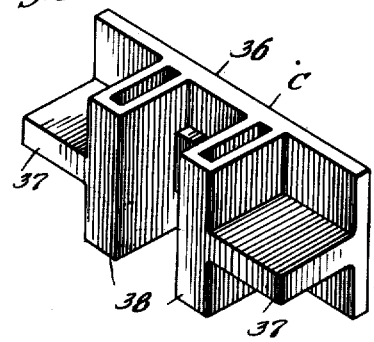
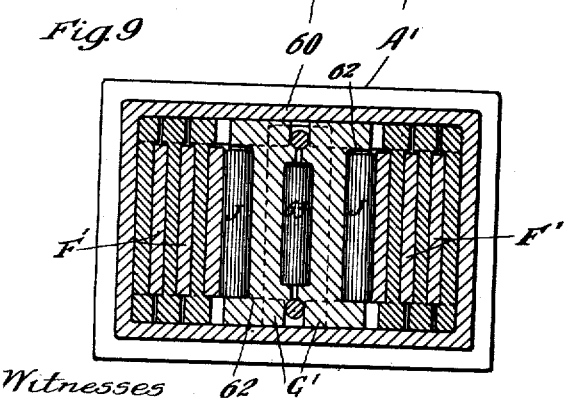
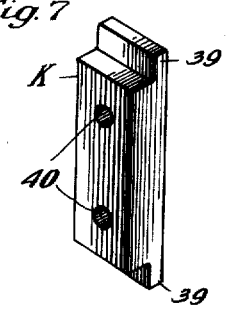
Witnesses
Wm Geiger
Inventor
John F. O'Connor
By Geo. I. Haight
His Atty Patented Mar. 20, 1923.

1,448,765

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed June 13, 1921. Serial No. 476,959.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

As is well known by those skilled in the art of railway draft riggings, the space within which the shock absorbing mechanism proper is accommodated is very strictly limited by rules and regulations of standardization, the present practice limiting such space to a length of 24⅝", a width between draft sills of 12⅞" a height of approximately 9" and a compression stroke or movement of preferably 2¾". Notwithstanding the restricted space allowed for shock absorbing mechanisms for railway draft riggings, manufacturers are compelled to provide shock absorbing mechanisms which must withstand more severe service conditions from year to year. Service conditions have become very much more severe as compared with those of a few years ago, due to the constant increase in the size of individual cars, the increase in load per car, the gradual increase in length of train, the increase in tractive effort and speed of locomotives, and the greater speed demanded in switching cars at dump yards. Originally springs afforded sufficient capacity but as conditions changed, manufacturers resorted to the use of friction mechanisms and, in late years, efforts have been concentrated in developing greater friction. Due to the restricted space in which such mechanisms are contained, there is necessarily a limit to the amount of material which can be employed and heretofore, the greater capacity of such shock absorbing mechanisms has been obtained by gradually increasing the stress on the friction elements to obtain greater friction. Obviously there is a limit to which metals can be stressed without danger of destruction and, furthermore, on account of the necessity of an instantaneous release of the mechanism after a compression stroke, great care must be exercised to avoid increases of stresses and friction to an extent that will militate against a proper release. Theoretically, it is possible to obtain any desired frictional capacity to resist a shock during a compression stroke of the mechanism by varying the wedging angles. However, the capacity is only one of the factors of a shock absorbing mechanism and another factor which is equally important for a commercially successful mechanism is to be able to release instantaneously and restore the parts to normal position without danger of sticking for the reason that the mechanism may be subjected to rapid successive shocks either in the same direction or alternate directions and if a mechanism did not release instantaneously upon the discontinuance of one blow, the next successive blow would not be cushioned but instead would be transmitted through a solid column to the underframe of the car with consequent destruction. Another essential factor in any practical shock absorbing mechanism for railway draft riggings is a comparatively low "ultimate load" transmitted to the draft sills and underframe of the car. In other words, while a shock absorbing mechanism may absorb a heavy blow or do work corresponding to many thousand foot pounds, nevertheless, such work performed must be distributed as uniformly as possible over the entire compression stroke so as to avoid any undue "peak" in the performance of the work since any undue peak or ultimate load transmitted to the draft sills and underframe of the car will very quickly destroy the latter.

It is further recognized in the art that shock absorbing mechanisms must be designed to withstand successfully the maximum loads to which they may become subject from time to time but that such maximum loads constitute only a comparatively small percentage of the total number of blows or shocks to which the mechanism is subject over any reasonable period of time. That is to say, for each unusually severe shock or load to which a shock absorbing mechanism on a railway car is subject, there will be fifty to seventy-five much lighter blows. It therefore follows that a mechanism, to be entirely successful commercially must not only successfully withstand the heavy or maximum loads, but also provide an easy cushioning action for smaller loads or, stated in another manner, must not be stiff in its action under either light or heavy shocks.

One object of my invention is to provide a shock absorbing mechanism of the spring friction type which is especially adapted for service in railway draft riggings, which complies with the standardized restrictions governing space allowed for it on a car and stroke, which is of exceedingly high shock absorbing capacity, which is provided with an unusual amount of frictional wearing areas, which maintains the pressure on the frictional surfaces at a comparatively small minimum per unit of area to thereby insure long life, which provides for an instantaneous full release, and which insures the ultimate load transmitted to the sills being confined within such limits as to prevent destruction of the underframe structure of the car.

Another object of the invention is to provide a mechanism of the character above indicated wherein are employed wedging or pressure-creating devices such that they are extremely sensitive in producing the necessary pressure duing compression and in instantaneously relieving the pressure upon initiation of the release stroke of the mechanism.

Another object of the invention is to provide a friction shock absorbing mechanism of the character indicated wherein are employed intercalated and preferably alternated relatively stationary and movable friction plates arranged in an unusually compact manner to the end that the over-all length of the stationary and movable plates is reduced to a minimum while at the same time allowing the necessary movement and actuation of the movable plates by direct pushing on opposite ends alternately.

Other objects of the invention will more clearly appear from the description and claims hereinafter following.

In the drawings forming a part of this specification, Fig. 1 is a horizontal longitudinal sectional view of a portion of a railway draft rigging showing my improvements in connection therewith. Fig. 2 is a vertical transverse sectional view taken substantially on the line 2—2 of Fig. 1. Fig. 3 is a view similar to Fig. 1 of the shock absorbing mechanism proper but showing the position assumed by the parts at the end of a full compression stroke. Fig. 4 is a vertical longitudinal sectional view corresponding substantially to the line 4—4 of Fig. 1 parts being broken away to better accommodate the figure on the sheet. Figs. 5, 6 and 7 are detail perspectives of one of the stationary friction plates, the spring follower and an anchor block respectively. Figs. 8 and 9 are views similar to Figs. 1 and 2, respectively, but illustrating another embodiment of the invention.

Referring first to the construction illustrated in Figs. 1 to 7, 10—10 denote channel draft sills of a railway car to the inner faces of which are secured front stop lugs 11 and rear stop lugs 12. A portion of a draw bar is indicated at 13 the same being operatively connected with the shock absorbing mechanism proper by a hooded cast yoke 14 and coupler key 15. The yoke and parts therewithin are supported in operative position by the detachable saddle plate 16. An ordinary front follower 17 is shown as employed with my construction. The improved shock absorbing mechanism proper as shown, comprises, broadly, a casting A; twin springs B—B; a spring follower C; a plurality of relatively stationary friction plates E—E; a plurality of relatively movable friction plates F—F; a wedge G; a pair of wedge friction shoes H—H; anti-friction rollers J—J; a locking block or bar K; and retainer bolts L—L.

The casting A is preferably in the form of a malleable casting and acts as a column-load-sustaining member and also as a follower member; said casting A is formed with top and bottom walls 17'—17', side walls 18—18 and rear vertical connecting wall 19, the latter functioning as the rear follower proper of the draft gear. The side walls 18—18 are relatively short considered lengthwise of the mechanism so as to leave the major portion of the sides of the casting A open to permit of the insertion and removal of the follower C, springs B and block K.

From the preceding description it will be seen that casting A is formed at its front or outer end with what may be termed a hollow substantially rectangular casing. The top and bottom walls defining said casing are provided with transversely extending ribs 20—20 and transversely extending rear shoulders 21—21. The latter are interrupted or inwardly offset at the center of the casing as indicated at 22—22 for the purpose of accommodating the block K as hereinafter described. The ribs 20 provide forwardly facing transverse shoulders 23 and rearwardly facing shoulders 24—24 to cooperate with corresponding shoulders 123 and 124 on the top and bottom thickened edges of the plates E. The shoulders 21 cooperate with the inner ends or shoulders 121 of the plates E. With this arrangement, it is evident that the plates E are anchored against longitudinal movement with respect to the casting A but are, however, freely responsive to laterally applied pressure.

Each of the plates E with the exception of the two outermost ones thereof as hereinafter described, is preferably made as best shown in Figures 2 and 5. Each of said plates has the top and bottom edges thereof widened or thickened as indicated at 25—25 so as to render the plate E of substantially I cross-section as shown in Fig. 2. The I cross-section produces longitudinally extending channels or guideways 26—26 one on each side thereof. At their inner ends, each plate E is cut away with a forwardly slightly tapering recess 27 for the purpose hereinafter described, the depth of the cut away portions 27 being preferably slightly greater than the full movement allowed the movable plates F.

The two outermost stationary plates E are of the cross-section best indicated in Fig. 2 where it will be noted that the outer sides thereof are left flat or plain except where notched at the forward end thereof as indicated at 28 in Fig. 1 to thereby adapt said outermost plates to be suitably seated against the side walls 18 of the casting A.

The movable plates F are all of like construction and each is of plain rectangular form. The said plates F will ordinarily be cut in lengths from a suitable rolled strip and in this connection I prefer that the plates F be so cut from such strips that the rolled edges of the strip will come at the front and rear ends of the plates F as indicated at 29 and 30. This minimizes the tendency of the plates F to gouge into those parts of the mechanism which push them back and forth and leaves the sheared edges at the top and bottom which are not subject to any particular amount of pressure or wear. As shown in Fig. 2. the thickness of the plates F and the depth of the channel groove 26 in plates E will be so proportioned that slight spaces 31 will be left between the thickened edges of the plates E so as to provide for wear on the friction surfaces and always allow all of the plates to respond freely to laterally or transversely applied pressure. As will be evident from an inspection of Fig. 3, the length of the stationary plates is preferably slightly longer than that of the movable plates although the stationary and movable plates may be made of equal length.

In carrying out my invention, I preferably separate the intercalated friction plates into two laterally spaced groups so as to leave an intermediate space to accommodate the wedging or pressure-creating system. The latter, as shown, comprises the wedge G, the rollers J and shoes H. The wedge G has direct bearing at its outer end against the follower 17 and at its inner end is provided with a pair of inwardly converging roller wedge seats 32—32. At the inner end of each seat 32 is a limiting shoulder 33 for the corresponding roller J as will be understood. Each of the wedge friction shoes H is formed on its outer side with a longitudinally extending flat surface 34 and on its inner side with a wedge roller seat 35 opposed to the corresponding seat 32. In addition, each shoe H is formed with upper and lower inwardly extended flanges 135—135 (see Fig. 2) which straddle the roller and prevent the latter from moving lengthwise. In this connection it will be noted that there is no limiting shoulder for the rollers on the shoes H. Hence the roller seats 35 may be finished accurately, without difficulty, notwithstanding the fact that the finishing tool must be accommodated between the flanges 135—135.

The spring follower C is sufficiently elongated so that it provides a bearing for the forward ends of both of the springs B. At the same time, its length is reduced so that it may be accommodated within all of the walls defining said casing and have the rear face 36 thereof lie flush with the inner edges of the side walls 18 of the casting A. On its forward side, as best shown in Fig. 6, the follower C is provided with transversely extending flanges 37—37 and with laterally spaced vertically extending hollow shoulders or ribs 38—38. The flanges 37 are adapted to be accommodated within the recesses 27 of the stationary plates E as clearly shown in Fig. 1, so that the forward edges of said flanges 37 may engage the inner edges 30 of the movable plates F during the release action to push the latter outwardly. The hollow ribs 38 provide bearings for the inner ends of the shoes H. The hollow ribs 38 are laterally separated so that they may straddle the locking block K and allow relative longitudinal movement therebetween as shown in Fig. 1.

The locking block K extends vertically of the casting A and is flanged as indicated at 39—39 at the top and bottom thereof, said flanges being adapted to engage the transverse ribs 20—20 at the center of the latter so that the block K is thereby limited in its outward movement with respect to the casting A. As heretofore described, there are interruptions or offsets 22 in shoulders 21, as shown best in Figures 1 and 4 so that said block K is allowed a limited amount of longitudinal movement with respect to the casting A. The block K is provided with upper and lower apertures 40—40 to accommodate the retainer bolts L, the heads of the latter engaging against the rear side of the block K as shown in Fig. 4. The wedge G is longitudinally recessed along its top and bottom faces as indicated at 41—41 in Fig. 2 to also accommodate the bolts L the nuts on the latter being accommodated in suitable pockets 42—42 in wedge G as shown in Fig. 4. With this arrangement, the wedge G is limited in its outward movement relatively to the casting A and hence the parts may be held in assembled relation and, if desired, the springs placed under an initial compression to thereby automatically compensate for wear when the mechanism is in service. The operation of the mechanism is as follows and in this connection it will be noted that the front follower 17 is normally slightly spaced from the forward ends 29 of the movable plates F this spacing preferably approximately one-half an inch. Assuming an inward or buffing movement of the draw bar, it is evident that the follower 17 will be forced inwardly thereby moving the wedge G simultaneously and uniformly therewith. During the first half inch movement of the follower 17 and wedge G, no actuation of the plates F will take place but on the contrary the entire wedging system including the wedge G, rollers J and shoes H, together with the spring follower C, will be moved longitudinally inwardly of the casting A independently of any movement of the plates F. During this first part of the compression stroke, it is evident that the spring follower C will be removed from engagement with the inner ends of the plates F and furthermore that the wedging or spreading action will be set up due to the resistance afforded by springs B reacting through the follower C. By this construction, the desired amount of wedging action can be determined and limited and the desired pressure between the stationary and movable plates created prior to movement of the plates F. It will be noted that the limit of this pressure is determined by the springs B and is not determined by the force of the blow transmitted from the draw bar.

After the first half inch movement of the follower 17 and after the desired wedging action has been set up, the follower engages the plates F and thereafter the latter move in unison with the follower 17, thus generating the desired frictional capacity supplemental to the spring capacity. At this point I desire to call attention to the fact that while the recesses 27 in the stationary plates E cause a certain loss of friction area, the loss is comparatively small compared to the entire amount of area provided and does not militate against the efficiency of the mechanism.

Upon removal of the actuating force, the springs are free to expand and in so doing force the follower C outwardly which in turn projects the shoes H and wedge G outwardly relatively to all of the friction plates. This action is instantaneous and extremely sensitive for the reason that there is no movement of any of the friction plates during the initial part of the release action and also on account of the anti-friction rollers employed between the parts of the wedging system. After the collapse of the wedging system and forcing of the same outwardly the limited distance above mentioned, the pressure on the friction plates will have been reduced to substantially the minimum and upon the flanges 37 coming into engagement with the inner edges 30 of the plates F, the latter may be easily projected outwardly to their normal position.

By employing the arrangement shown it is evident that I maintain at a minimum, the compression stresses on the rollers, wedge and shoes and hence avoid all danger of crushing or deformation of any of said parts. While the mechanism has an unusually great work-absorbing capacity, nevertheless the ultimate or peak load during a compression stroke which is transmitted to the underframe is kept well below those now occurring in many types of commercial draft gears employed on railway cars. This is because of the large amount of wearing areas employed and the fact that the work is done at a substantially uniform rate throughout the entire length of the compression stroke. It will further be observed that any small shock and particularly the multitude of small shocks resulting from surging of cars in a train, may be absorbed without any actuation of the friction plates and merely by the springs actuated through the pressure creating system.

Referring next to the construction illustrated in Figs. 8 and 9, the arrangement is generally the same as that hereinbefore described in detail except that the casting A' is cut away at its forward end on the outer side thereof as indicated at 60 and the follower 117 is provided with a telescoping flange 61. With this arrangement I am enabled to enclose all of the active parts of the friction mechanism to prevent deterioration from the weather and also prevent tampering with any of the parts. In Figs. 8 and 9, I have also shown a somewhat different wedging system consisting of two like wedge blocks G'—G' the same being oppositely arranged. Each of said blocks G' is formed on the outer side with two recesses 62—62 to accommodate a pair of anti-friction rollers J'—J', which roll directly upon the adjacent movable friction plates F'. An additional anti-friction roller 63 is employed between the two wedge blocks G' so that the wedging system is not only anti-frictionally mounted with respect to the friction plates, but the parts of the system are also anti-frictionally mounted with respect to each other. One block G' is directly actuated by follower 117 and the other has direct bearing against the spring follower C'. The arrangement of stationary and movable plates is the same as in the other construction described.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a load-sustaining member; of a plurality of intercalated relatively longitudinally movable and immovable friction elements mounted on said member and responsive to pressure applied transversely thereof, said immovable elements being as long as the movable elements and one set of ends of movable elements normally extended outwardly beyond the corresponding set of ends of the immovable elements; a combined cushioning and restoring spring resistance; an outer follower movable relatively toward and from said member and adapted to engage said extended ends of and push the movable friction elements during a compression stroke; means, actuated upon relative approach of said follower and member, arranged to increase the pressure transversely against and between said intercalated friction elements; and means for extending past the inner ends of the fixed plates for engaging the opposite ends of said movable friction elements to push them back to normal position during release of the mechanism.

2. In a friction shock absorbing mechanism, the combination with a loading-sustaining member; of a plurality of intercalated relatively longitudinally movable and immovable friction elements mounted on said member and responsive to pressure applied transversely thereof, said immovable elements being as long as the movable elements and one set of ends of the latter being normally extended beyond the corresponding set of ends of the immovable elements; a combined cushioning and restoring spring resistance; an outer follower movable relatively toward and from said member and adapted to engage said extended ends of and push the movable friction elements during a compression stroke; means, actuated upon relative approach of said follower and member, arranged to increase the pressure transversely against and between said intercalated friction elements; and means for engaging the opposite ends of said movable friction elements to push them back to normal position during the release of the mechanism, said immovable friction elements being partially cut away to accommodate said last named means in movements relatively to said immovable friction elements.

3. In a friction shock absorbing mechanism, the combination with a load-sustaining member; of a plurality of intercalated relatively longitudinally movable and immovable friction elements mounted on said member and responsive to pressure applied transversely thereof, said immovable elements being as long as the movable elements and one set of ends of movable elements normally extended outwardly beyond the corresponding set of ends of the immovable elements; a combined cushioning and restoring spring resistance; an outer follower movable relatively toward and from said member and adapted to engage said extended ends of and push the movable friction elements during a compression stroke; means, actuated upon relative approach of said follower and member, arranged to increase the pressure transversely against and between said intercalated friction elements; and a spring follower interposed between said spring resistance and the opposite ends of said movable friction elements and having means thereon extending beyond the inner ends of said immovable plates to engage the opposite ends of the movable plates to push them back to normal position during release of the mechanism.

4. In a friction shock absorbing mechanism, the combination with a load-sustaining member; of a plurality of intercalated relatively longitudinally movable and immovable friction elements mounted on said member and responsive to pressure applied transversely thereof, said immovable elements being as long as the movable elements and one set of ends of the latter being normally extended beyond the corresponding set of ends of the immovable elements; a combined cushioning and restoring spring resistance; an outer follower movable relatively toward and from said member and adapted to engage said extended ends of and push the movable friction elements during a compression stroke; means, actuated upon relative approach of said follower and member, arranged to increase the pressure transversely against and between said intercalated friction elements; and a spring follower interposed between said spring resistance and the opposite ends of said movable friction elements and arranged to engage the opposite ends of the latter to push them back to normal position during release of the mechanism, said spring follower having extensions on the side adjacent the plates and the immovable plates being cut away to accommodate said extensions.

5. In a friction shock absorbing mechanism, the combination with a load-sustaining member; of a plurality of intercalated relatively longitudinally movable and immovable friction elements mounted on said member and responsive to pressure applied transversely thereof, said immovable elements being as long as the movable elements and one set of ends of movable elements normally extended outwardly beyond the corresponding set of ends of the immovable elements; a combined cushioning and restoring spring resistance; an outer follower movable relatively toward and from said member and adapted to engage said extended ends of and push the movable friction elements during a compression stroke; means, actuated upon relative approach of said follower and member, arranged to increase the pressure transversely against and between said intercalated friction elements; and means for engaging the opposite ends of said movable friction elements to push them back to normal position during release of the mechanism, said means including engaging elements overlapping said immovable friction elements, both of said followers and pressure-creating means being adapted for a limited amount of movement longitudinally and independent of said movable friction elements.

6. In a friction shock absorbing mechanism, the combination with a load-sustaining member; of a plurality of intercalated relatively longitudinally movable and immovable friction elements mounted on said member and responsive to pressure applied transversely thereof, said immovable elements being as long as the movable elements and one set of ends of the latter being normally extended beyond the corresponding set of ends of the immovable elements; a combined cushioning and restoring spring resistance; an outer follower movable relatively toward and from said member and adapted to engage said extended ends of and push the movable friction elements during a compression stroke; means, actuated upon relative approach of said follower and member, arranged to increase the pressure transversely against and between said intercalated friction elements; and a spring follower interposed between said spring resistance and the movable friction elements, said spring follower having extensions therefrom on the side adjacent the friction elements and the immovable friction elements being recessed to accommodate said extensions, both of said followers and pressure-creating means being adapted for a limited amount of movement longitudinally and independent of said movable friction elements.

7. In a friction shock absorbing mechanism, the combination with a member having a hollow casing; of a plurality of intercalated relatively longitudinally movable and immovable friction elements mounted within said casing, said elements being divided into two separate groups and all of the elements being responsive to pressure applied transverse to the line of relative movement, said immovable elements being as long as the movable elements and one set of ends of the movable elements normally extending outwardly beyond the corresponding set of ends of the immovable elements; a combined cushioning and restoring spring resistance; an outer follower movable relatively toward and from said member and adapted to engage said extended ends of and push the movable friction elements inwardly of the casing during a compression stroke; means, located between said groups and actuated upon relative approach of said follower and member, arranged to augment the pressure on said elements transverse to their line of relative movement; and means overlapping the said immovable elements for directly engaging the opposite ends of the movable friction elements in both groups to push them back to normal position during the release action of the mechanism.

8. In a friction shock absorbing mechanism, the combination with a member having a hollow casing; of a plurality of intercalated relatively longitudinally movable and immovable friction elements mounted within said casing, said elements being divided into two separate groups and all of the elements being responsive to pressure applied transverse to the line of relative movement, said immovable elements being as long as the movable elements and one set of ends of the latter normally extending outwardly beyond the corresponding set of ends of the immovable elements; a combined cushioning and restoring spring resistance; an outer follower movable relatively toward and from said member and adapted to engage said extended ends of and push the movable friction elements inwardly of the casing during a compression stroke; means, located between said groups and actuated upon relative approach of said follower and member, arranged to augment the pressure on said elements transverse to their line of relative movement; and means for directly engaging the opposite ends of the movable friction elements in both groups to push them back to normal position during the release action of the mechanism, said immovable friction elements being partially cut away to accommodate said last named means.

9. In a friction shock absorbing mechanism, the combination with a member having a hollow casing; of a plurality of intercalated relatively longitudinally movable and immovable friction elements mounted within said casing, said elements being divided into two separate groups and all of the elements being responsive to pressure applied transverse to the line of relative movement, said immovable elements being as long as the movable elements and one set of ends of the movable elements normally extending outwardly beyond the corresponding set of ends of the immovable elements; a combined cushioning and restoring spring resistance; an outer follower movable relatively toward and from said member and adapted to engage said extended ends of and push the movable friction elements inwardly of the casing during a compression stroke; means, located between said groups and actuated upon relative approach of said follower and member, arranged to augment the pressure on said elements transverse to their line of relative movement; and a spring follower interposed between said spring resistance and the inner ends of the friction elements, said spring follower having extensions therefrom on the side adjacent the friction elements, said extensions overlapping ends of said immovable plates and arranged to engage the inner ends of the movable friction elements.

10. In a friction shock absorbing mechanism, the combination with a member having a hollow casing: of a plurality of intercalated relatively longitudinally movable and immovable friction elements mounted within said casing, said elements being divided into two separate groups and all of the elements being responsive to pressure applied transverse to the line of relative movement, said immovable elements being as long as the movable elements and one set of ends of the latter normally extending outwardly beyond the corresponding set of ends of the immovable elements; a combined cushioning and restoring spring resistance; an outer follower movable relatively toward and from said member and adapted to engage said extended ends of and push the movable friction elements inwardly of the casing during a compression stroke; means, located between said groups and actuated upon relatively approach of said follower and member, arranged to augment the pressure on said elements transverse to their line of relative movement; and a spring follower interposed between said spring resistance and the inner ends of the friction elements, said spring follower having extensions therefrom on the side adjacent the friction elements, said extensions being arranged to engage the inner ends of the movable friction elements, said immovable friction elements being cut away to accommodate said extensions.

11. In a friction shock absorbing mechanism, the combination with a member having a hollow casing; of a plurality of intercalated relatively longitudinally movable and immovable friction elements mounted within said casing, said elements being divided into two separate groups and all of the elements being responsive to pressure applied transverse to the line of relative movement, said immovable elements being as long as the movable elements and one set of ends of the movable elements normally extending outwardly beyond the corresponding set of ends of the immovable elements; a combined cushioning and restoring spring resistance; an outer follower movable relatively toward and from said member and adapted to engage said extended ends of and push the movable friction elements inwardly of the casing during a compression stroke; means, located between said groups and actuated upon relative approach of said follower and member, arranged to augment the pressure on said elements transverse to their line of relative movement; and means overlapping said immovable elements for directly engaging the opposite ends of the movable friction elements in both groups to push them back to normal position during the release action of the mechanism, said last named means, follower and pressure-creating means all having a limited amount of movement longitudinally and independently of said movable friction elements.

12. In a friction shock absorbing mechanism, the combination with a member having a hollow casing: of a plurality of intercalated relatively longitudinally movable and immovable friction elements mounted within said casing, said elements being divided into two separate groups and all of the elements being responsive to pressure applied transverse to the line of relative movement, said immovable elements being as long as the movable elements and one set of ends of the movable elements normally extending outwardly beyond the corresponding set of ends of the immovable elements; a combined cushioning and restoring spring resistance; an outer follower movable relatively toward and from said member and adapted to engage said extended ends of and push the movable friction elements inwardly of the casing during a compression stroke; means, located between said groups and actuated upon relative approach of said follower and member, arranged to augment the pressure on said elements transverse to their line of relative movement; and a spring follower interposed between said spring resistance and the inner ends of the friction elements, said spring follower having extensions therefrom on the side adjacent the friction elements, said extensions being arranged to engage the inner ends of the movable friction elements, and overlap the ends of said immovable elements, both of said followers and pressure-creating means having a limited amount of movement longitudinally and independently of said movable friction elements.

13. In a friction shock absorbing mechanism, the combination with a casting having a hollow casing at one end and a spring cage, said member being adapted to function as a follower: of a plurality of relatively stationary friction plates anchored within said casing against longitudinal movement; a plurality of friction plates movable longitudinally of said stationary plates and within the casing, said stationary plates being as long as the movable plates and the movable plates having their outer ends normally projecting outwardly beyond the corresponding ends of said stationary plates and outside of the casing, said stationary and movable plates being alternated and divided into two separate groups; a spring resistance within said cage; an outer follower movable relatively toward and from said casting and adapted to engage said extended ends of and push said movable plates inwardly of the casing during a compression stroke; means located between said groups and actuated upon relative approach of said follower and casting arranged to increase the transverse pressure on both of said groups of plates; and means, overlapping said stationary friction plates and actuated by the spring resistance during release movement for directly engaging the inner ends of said movable friction plates in both groups to push the movable plates back to normal position.

14. In a friction shock absorbing mechanism, the combination with a casting having a hollow casing at one end and a spring cage, said member being adapted to function as a follower; of a plurality of relatively stationary friction plates anchored within said casing against longitudinal movement; a plurality of friction plates movable longitudinally of said stationary plates and within the casing, said stationary plates being as long as the movable plates and the latter having their outer ends normally projecting beyond the corresponding ends of said stationary plates and outside of the casing, said stationary and movable plates being alternated and divided into two separate groups; a spring resistance within said cage; an outer follower movable relatively toward and from said casting and adapted to engage said extended ends of and push said movable plates inwardly of the casing during a compression stroke; means located between said groups and actuated upon relative approach of said follower and casting arranged to increase the transverse pressure on both of said groups of plates; and means, actuated by the spring resistance during release movement for directly engaging the inner ends of said movable friction plates in both groups to push the movable plates back to normal position, said stationary plates being cut away to accommodate said last named means.

15. In a friction shock absorbing mechanism, the combination with a casting having a hollow casing at one end and a spring cage, said member being adapted to function as a follower; of a plurality of relatively stationary friction plates anchored within said casing against longitudinal movement; a plurality of friction plates movable longitudinally of said stationary plates and within the casing, said stationary plates being as long as the movable plates and the latter having their outer ends normally projecting beyond the corresponding ends of said stationary plates and outside of the casing, said stationary and movable plates being alternated and divided into two separate groups; a spring resistance within said cage; an outer follower movable relatively toward and from said casting and adapted to engage said extended ends of and push said movable plates inwardly of the casing during a compression stroke; means located between said groups and actuated upon relative approach of said follower and casting arranged to increase the transverse pressure on both of said groups of plates; and a spring follower interposed between said spring resistance and the friction plates, said spring follower having forward extensions on each end thereof arranged to engage the inner ends of said movable friction plates of both groups during release movement, the stationary plates being cut away to accomodate said extensions.

16. In a friction shock absorbing mechanism, the combination with a casting having a hollow casing at one end and a spring cage; said member being adapted to function as a follower; of a plurality of relatively stationary friction plates anchored within said casing against longitudinal movement; a plurality of friction plates movable longitudinally of said stationary plates and within the casing, said stationary plates being as long as the movable plates and the movable plates having their outer ends normally projecting outwardly beyond the corresponding ends of said stationary plates and outside of the casing, said stationary and movable plates being alternated and divided into two separate groups; a spring resistance within said cage; an outer follower movable relatively toward and from said casting and adapted to engage said extended ends of and push said movable plates inwardly of the casing during a compression stroke; means located between said groups and actuated upon relative approach of said follower and casting arranged to increase the transverse pressure on both of said groups of plates; and means, overlapping said stationary friction plates and actuated by the spring resistance during release movement for directly engaging the inner ends of said movable friction plates in both groups to push the movable plates back to normal position, said last named means, follower and pressure-creating means being movable as a unit for a limited distance independent of said movable friction plates.

17. In a friction shock absorbing mechanism, the combination with a casting having a hollow casing at one end and a spring cage, said member being adapted to function as a follower; of a plurality of relatively stationary friction plates anchored within said casing against longitudinal movement; a plurality of friction plates movable longitudinally of said stationary plates and within the casing, said stationary plates being as long as the movable plates and the latter having their outer ends normally projecting beyond the corresponding ends of said stationary plates and outside of the casing, said stationary and movable plates being alternated and divided into two separate groups; a spring resistance within said cage; an outer follower movable relatively toward and from said casting and adapted to engage said extended ends of and push said movable plates inwardly of the casing during a compression stroke; means located between said groups and actuated upon relative approach of said follower and casting arranged to increase the transverse pressure on both of said groups of plates; and a spring follower interposed between said spring resistance and the friction plates, said spring follower having forward extensions on each end thereof arranged to engage the inner ends of said movable friction plates of both groups during release movement, the stationary plates being cut away to accomodate said extensions, both of said followers and the pressure-creating means being movable as a unit for a limited distance longitudinally and independently of said movable plates during compression and release movement.

In witness that I claim the foregoing I have hereunto subscribed my name this 9th day of June, 1921.

JOHN F. O'CONNOR.

Witnesses:
CARRIE GAILING,
ANN BAKER.